US011621801B2

(12) United States Patent
Dash et al.

(10) Patent No.: US 11,621,801 B2
(45) Date of Patent: Apr. 4, 2023

(54) HYBRID DISTRIBUTED RETRY MECHANISM

(71) Applicant: SEMICONDUCTOR COMPONENTS INDUSTRIES, LLC, Phoenix, AZ (US)

(72) Inventors: Debashis Dash, Newark, CA (US); Imran Latif, Fremont, CA (US); Sigurd Schelstraete, Menlo Park, CA (US); Hossein Dehghan, Diablo, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 18 days.

(21) Appl. No.: 16/867,343

(22) Filed: May 5, 2020

(65) Prior Publication Data

US 2021/0351869 A1 Nov. 11, 2021

(51) Int. Cl.
*H04L 1/08* (2006.01)
*H04L 1/00* (2006.01)
*H04L 41/0654* (2022.01)

(52) U.S. Cl.
CPC .............. *H04L 1/08* (2013.01); *H04L 1/0027* (2013.01); *H04L 1/0045* (2013.01); *H04L 41/0654* (2013.01)

(58) Field of Classification Search
CPC ....... H04L 1/08; H04L 1/0026; H04L 1/0027; H04L 1/0045; H04L 1/1812; H04L 1/1816; H04L 1/1819; H04L 1/1896; H04L 41/0654; H04L 2001/0097; H04L 5/0055; H04W 88/04; H04W 40/22; H04W 52/48; H04B 7/14; H04B 7/145; H04B 7/15; H04B 7/026; H04B 7/15542; H04B 7/15592; H04B 7/0417; H04B 7/15507; H04B 17/40
See application file for complete search history.

(56) References Cited

U.S. PATENT DOCUMENTS

| | | | |
|---|---|---|---|
| 2013/0135988 A1* | 5/2013 | Kim | H04L 1/1887 370/216 |
| 2014/0092824 A1 | 4/2014 | He et al. | |
| 2015/0085680 A1* | 3/2015 | Vrzic | H04L 5/0055 370/252 |
| 2017/0230149 A1 | 8/2017 | Wang et al. | |
| 2017/0353963 A1* | 12/2017 | Hong | H04L 5/0091 |
| 2020/0036483 A1* | 1/2020 | Aijaz | H04L 1/1874 |

(Continued)

OTHER PUBLICATIONS

U.S. Appl. No. 62/882,305 (Year: 2019).*

*Primary Examiner* — Peter Chen
(74) *Attorney, Agent, or Firm* — Maschoff Brennan

(57) ABSTRACT

A method may include determining at a first AP that a first original packet sent from a second AP to a STA failed to decode at the STA. The method may include sending from the first AP a first retransmission packet that includes error correction information for the first original packet the STA. The method may include the first AP coordinating with a third AP that is sending an ongoing communication to another STA to avoid interference between the first retransmission packet and the ongoing communication. The method may include sending a second original packet from the first AP to the STA or the other STA.

18 Claims, 4 Drawing Sheets

(56) References Cited

U.S. PATENT DOCUMENTS

2020/0153547 A1    5/2020  Latif et al.
2020/0322839 A1*  10/2020  Nguyen ................ H04W 28/04
2021/0036763 A1*  2/2021  Nam .................. H04B 7/15528
2021/0307069 A1*  9/2021  Xin ....................... H04B 7/0617

* cited by examiner

US 11,621,801 B2

HYBRID DISTRIBUTED RETRY MECHANISM

FIELD

The implementations discussed herein relate to a hybrid distributed retry mechanism.

BACKGROUND

Unless otherwise indicated in the present disclosure, the materials described in the present disclosure are not prior art to the claims in the present application and are not admitted to be prior art by inclusion in this section.

Some wireless communication standards, such as some Wi-Fi standards, implement Link Adaptation (LA) to adapt transmissions from a specific transmitter to a specific receiver to fulfill a certain failure rate requirement. In particular, the transmitter may adapt its transmission based on feedback provided by the receiver in the form of a channel quality indicator. The transmitter may determine, based on the feedback, an appropriate transmission scheme to fulfill the failure rate requirement.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an implementation a method to perform hybrid distributed retries or retransmissions may include determining that an original packet sent from a first wireless station (STA) to a second STA failed to decode at the second STA. The method may include sending a retransmission packet that includes all or a portion of the original packet or error correction information for the original packet from a third STA to the second STA.

In another implementation, a method to implement Automatic Repeat Request (ARQ)/Hybrid ARQ (HARQ) from hybrid distributed retries or retransmissions may include receiving an original packet from a first STA over a first radio link at a second STA. The method may include failing to decode the original packet to produce a failed packet. The method may include receiving a retransmission packet that includes all or a portion of the original packet or error correction information for the original packet from: the first STA over a second radio link that is different than the first radio link; or a third STA that is different than the first STA. The method may include successfully decoding the original packet based on the retransmission packet.

BRIEF DESCRIPTION OF THE DRAWINGS

Example implementations will be described and explained with additional specificity and detail through the use of the accompanying drawings in which.

DETAILED DESCRIPTION

LA may ensure that transmissions in a wireless network are successful most of the required time (depending on the failure rate requirement) with certain transmission parameters, such as a particular modulation and coding scheme (MCS), for current channel conditions. In some circumstances, the supported transmission parameter(s) may provide lower throughput or data rate than is required or expected.

When the throughput or data rate is lower than required or expected, it can be addressed by, e.g., the receiver discarding the received data which was not decoded successfully and asking for a retransmission of the data from the transmitter. The transmitter may select a lower MCS than the original data to make sure—or at least increase the likelihood—that on the retransmission the data is decoded successfully at the receiver. This process may be referred to as ARQ.

Alternatively, rather than reducing the transmission parameters (e.g., MCS) to lower levels, the receiver may store the unsuccessfully decoded packet and still ask for retransmission of the data or a punctured version of the data one or more times. The receiver may then combine the data from the original transmission and one or more resulting retransmissions and decode the data based on the combination. This process may be referred to as HARQ.

Either or both of the foregoing may increase data rates or throughputs which may come from coding gain, channel diversity gain, or other gain.

In some wireless networks, both HARQ and ARQ retransmissions use the same radio link and the same access point (AP) or other STA as the original data. However, retransmission gains may be limited where channel does not change, or changes relatively little, over time and frequency, i.e., where the channel is time invariant and frequency invariant.

Accordingly, some implementations described herein perform ARQ/HARQ retransmissions from one or more different STAs (e.g., APs) than the original data or over one or more different radio links than the original data. When one or more different STAs are used for the retransmission, the retransmission is sent over one or more different channels than the original data which provides channel diversity gain. When one or more different radio links are used for the retransmission, the use of the different radio links provides frequency diversity gain.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

Figure 1A:
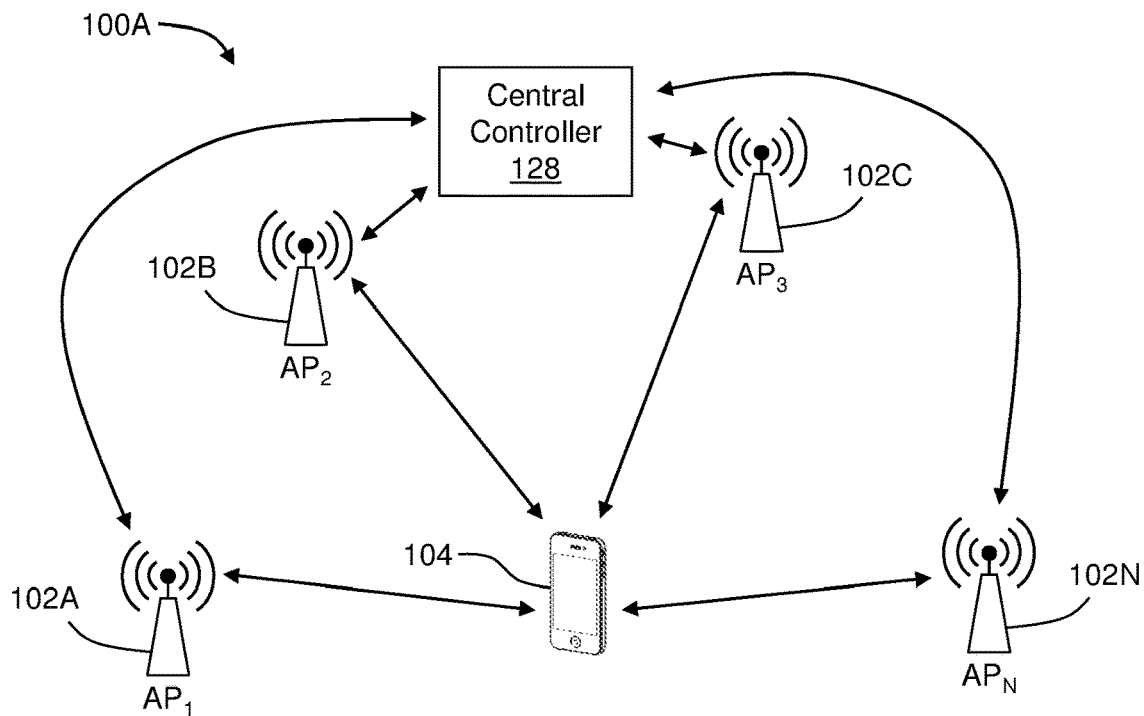
FIG. 1A illustrates an example environment in which a hybrid distributed retry mechanism may be implemented.

FIG. 1A illustrates an example environment 100A in which a hybrid distributed retry mechanism may be implemented. The environment 100A may include one or more APs 102A, 102B, 102C, . . . 102N (hereinafter collectively "APs 102" or generically "AP 102") and a STA 104. The APs 102 may include at least a first AP 102A—also referred to as $AP_1$ 102A, and optionally one or more of a second AP 102B—also referred to as $AP_2$ 102B, a third AP 102C—also referred to as $AP_3$ 102C, and a Nth AP 102N—also referred to as $AP_N$ 102N. Any of the APs 102 may form a wireless network with the STA 104 or other STAs not illustrated in FIG. 1A for simplicity.

Each of the APs 102 may include a gateway, a repeater, a mesh node, or other suitable AP for wireless stations or devices such as the STA 104. In some implementations, any of the APs 102 may provide access to the Internet for the STA 104. Examples of the STA 104 may include personal computers, printers, televisions, digital video disc (DVD) players, security cameras, smartphones, tablets, smart devices, or any other appropriate computing device configured for wireless communication. In these and other implementations, the AP 102 and the STA 104 may implement one or more of the IEEE 802.11 protocols which are contention-based protocols to handle communications among multiple competing devices for a shared wireless communication medium on a selected one of multiple communication channels. The frequency range of each communication channel is specified in the corresponding one of the IEEE 802.11 protocols being implemented, e.g. "a", "b", "g", "n", "ac", "ad", "ax".

The APs 102 and the STA 104 may implement ARQ or HARQ. Any suitable ARQ or HARQ protocol may be implemented in the environment 100A of FIG. 1A and other environments described herein. For example, the ARQ protocol implemented in the environment 100A of FIG. 1A and other environments described herein may include Stop-and-wait ARQ, Go-Back-N ARQ, Selective Repeat ARQ/Selective Reject ARQ, or other suitable ARQ protocol. Alternatively or additionally, the HARQ protocol implemented in the environment 100A of FIG. 1A and other environments described herein may include Type I HARQ, Type II HARQ, HARQ with soft combining, HARQ with Chase combining, Incremental Redundancy HARQ (IR-HARQ), or other suitable HARQ protocol.

In all ARQ implementations in the environment 100 and other environments herein, an original packet is sent from one of the APs 102 to the STA 104. If the STA 104 fails to decode the original packet, a retransmission packet that includes all of the original packet—with a more reliable/lower MCS—may be sent to the STA 104. The STA 104 discards the failed packet and attempts to decode the original packet based exclusively on the retransmission packet.

In all HARQ implementations in the environment 100 and other environments herein, an original packet is sent from one of the APs 102 to the STA 104, similar to ARQ. If the STA 104 fails to decode the original packet, a retransmission packet that includes some or all of the original packet may be sent to the STA 104. In some implementations, the STA 104 may specify specific parts of the original packet that failed to decode to request that generally only those portions of the original packet be included in the retransmission packet. Alternatively or additionally, the retransmission packet may include error correcting information such as FEC parity bits to decode the original packet when Type II HARQ is implemented, and/or additional parity information to decode the original packet when IR-HARQ is implemented.

In HARQ, when the retransmission packet includes all of the original packet, the STA 104 may decode the original packet based solely on the retransmission packet and exclusive of the failed packet, or the STA 104 may soft combine the retransmission packet and the failed packet to decode the original packet based on both the retransmission packet and the failed packet. When the retransmission packet includes some but not all of the original packet, the STA 104 may soft combine the retransmission packet and the failed packet to decode the original packet based on both the retransmission packet and the failed packet. When the retransmission packet includes error correction information, the STA 104 may decode the original packet based on the retransmission packet, e.g., by applying the error correction information to the failed packet.

For simplicity, the above and other implementations are described herein in the context of one or more of the APs 102 sending ARQ/HARQ retransmissions to the STA 104. More generally, implementations described herein may involve sending ARQ/HARQ retransmissions from one or more STAs (such as any of the APs 102 or the STA 104) to another STA (such as the STA 104 or one of the APS 102).

Figure 1B:
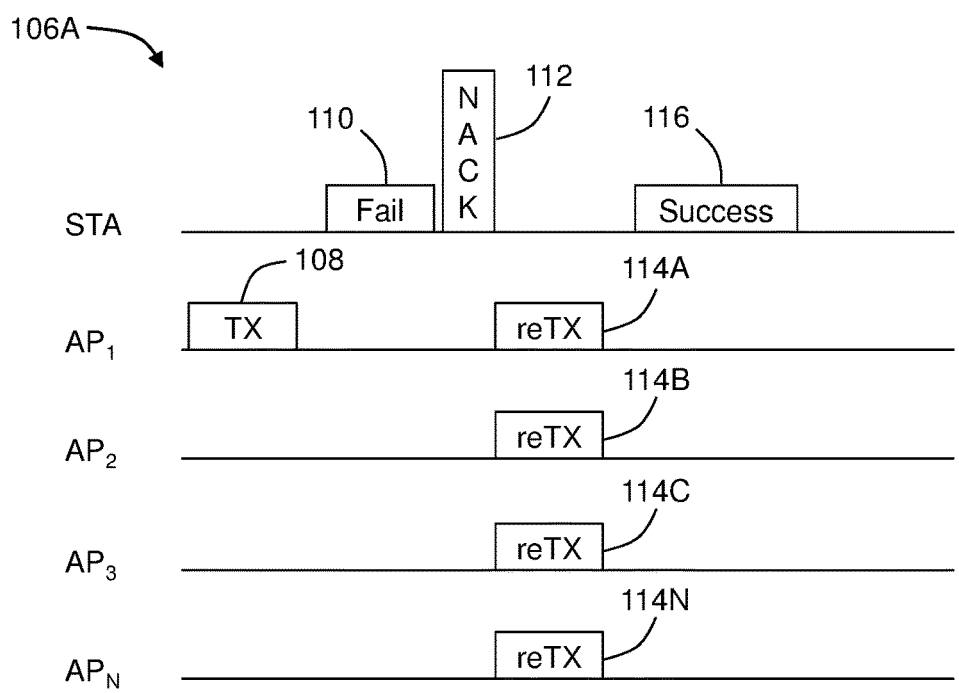
FIG. 1B illustrates an example communication flow for a hybrid distributed retry mechanism that may be implemented in the environment of FIG. 1A.

FIG. 1B illustrates an example communication flow 106A for a hybrid distributed retry mechanism that may be implemented in the environment 100A of FIG. 1A. As illustrated, the $AP_1$ 102A sends an original packet 108 to the STA 104. The STA 104 receives the original packet 108 but is unable to decode it, illustrated as a failed packet 110 in FIG. 1B. The STA 104 may discard some or all of the failed packet 110 or store some or all of the failed packet 110 depending on a particular implementation of ARQ or HARQ implemented at the STA 104. Although not illustrated in FIG. 1B, in an example implementation, each or at least one of the other APs 102 may receive and successfully decode the original packet 108 despite not being an intended recipient of the original packet 108. In this and other implementations, one or more of the other APs 102 may overhear the original packet 108 when sent by the $AP_1$ 102A to the STA 104, may successfully decode the original packet 108 at the corresponding AP 102, and may save the original packet 108 locally at the corresponding AP 102 for subsequent retransmission in whole or in part to the STA 104, if needed.

In response to failing to decode the original packet 108, e.g., in response to the failed packet 110, the STA 104 may send a negative acknowledgment (NACK) or other STA response 112 to the $AP_1$ 102A to indicate that some or all of the original packet 108 failed to decode at the STA 104. The STA response 112 may be received by one or more of the APs 102, from which the corresponding AP(s) 102 may determine that the original packet 108 failed to decode at the STA 104. In other implementations, mechanisms other than the STA response 112—such as a timeout or trigger frame from the $AP_1$ 102A—may be used by the corresponding AP(s) 102 to determine that the original packet 108 failed to decode at the STA 104.

Typical ARQ/HARQ processes then send a retransmission packet 114A to the STA 104 from the $AP_1$ 102A that sent the original packet 108 and over a same radio link as used to send the original packet 108. Where the channel between the $AP_1$ 102A and the STA 104 is substantially time and/or frequency invariant, such an approach to ARQ/HARQ may have limited retransmission gains.

According to implementations described herein, however, one or more of the other APs 102 that did not send the original packet 108 may alternatively or additionally send a corresponding retransmission packet 114B, 114C, 114N to the STA 104. Each of the retransmission packets 114A, 114B, 114C, 114N (collectively "retransmission packets 114" or generically "retransmission packet 114") may include all or a portion of the original packet 108 or error correction information for the original packet. Providing at least one retransmission packet 114 to the STA 104 from a different AP 102 than the $AP_1$ 102A that sent the original packet 108 increases channel diversity and may therefore improve retransmission gain compared to sending the retransmission packet 114 only from the same $AP_1$ 102A that sent the original packet 108.

In some implementations where two or more of the APs 102 send retransmission packets 114 for the same failed packet 110, the APs 102 may synchronize with each other to simultaneously send their respective retransmission packets 114 to the STA 104. The APs 102 may use the original packet 108 or the STA response 112 to synchronize the retransmission.

Alternatively or additionally, one or more of the APs 102 may be engaged in an ongoing communication with an other STA (not shown) in the environment 100A. To avoid interference between the retransmission packet 114 and the ongoing communication, the APs 102 may coordinate directly with each other or through a central controller to permit simultaneous transmission of the ongoing communication and the retransmission packet. Coordinating between the APs 102 may include exchanging channel state information of some or all STAs communicatively coupled to the APs 102 among all the APs 102. The AP 102 involved in the retransmission may send the retransmission packet orthogonally to the ongoing communication. For example, suppose the $AP_2$ 102B is going to send the retransmission packet 114B and the $AP_3$ 102C is engaged in an ongoing communication. In this example, the $AP_2$ 102B and the $AP_3$ 102C may coordinate so that the ongoing communication and the retransmission packet 114B are orthogonal to each other, e.g., by implementing time division multiple access (TDMA) or beamforming. In particular, for example, the $AP_2$ 102B may transmit the retransmission packet 114B to the STA 104 during different timeslot(s) than the $AP_3$ 102C transmits the ongoing communication to the other STA, or the $AP_2$ 102B may beamform the retransmission packet 114B so that it is received at the STA 104 but is nulled at the other STA.

The STA 104 receives the retransmission packet(s) 114 from one or more of the APs 102 and successfully decodes it(them), illustrated as a successfully decoded packet 116 in FIG. 1B. In more detail, for ARQ, the STA 104 may discard the failed packet 110 and successfully decode the original packet 108 using the retransmission packet(s) exclusive of the failed packet 110. For HARQ, the STA 104 may successfully decode the original packet 108 using either or both of the retransmission packet(s) 114 and the failed packet 110, e.g., using chase combining HARQ or IR-HARQ.

FIGS. 1A-1B describe the $AP_1$ 102A as sending the original packet 108 for convenience. More generally, any of the APs 102 may send the original packet 108 with one or more other APs 102 sending the retransmission packet 114.

Figure 1C:
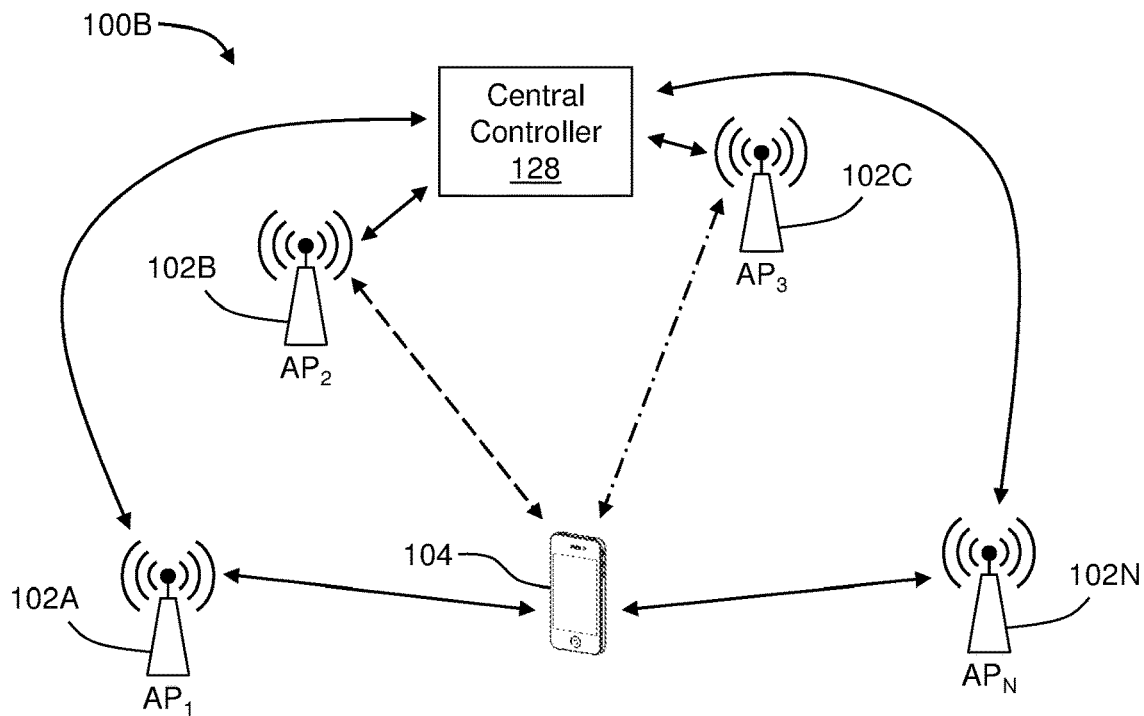
FIG. 1C illustrates another example environment in which a hybrid distributed retry mechanism may be implemented.

FIG. 1C illustrates another example environment 100B in which a hybrid distributed retry mechanism may be implemented. The environment 100B may include one or more of the APs 102 and the STA 104 as described with respect to FIG. 1A. Any of the APs 102 may form a wireless network with the STA 104 or other STAs not illustrated in FIG. 1C for simplicity.

In FIG. 1C, the STA 104 may have multiple different radios to communicate over multiple different radio links, including a first radio link, a second radio link, and a third radio link. The $AP_1$ 102A and the $AP_N$ 102N may each be configured to communicate with the STA 104 over at least the first radio link, such as a 5 gigahertz (GHz) radio link. The $AP_2$ 102B may be configured to communicate with the STA 104 over at least the second radio link, such as a 2.4 GHz radio link. The $AP_3$ 102C may be configured to communicate with the STA 104 over at least the third radio link, such as a 6 GHz radio link.

As in FIG. 1A, the APs 102 and the STA 104 in FIG. 1C may implement any suitable ARQ or HARQ process.

Figure 1D:
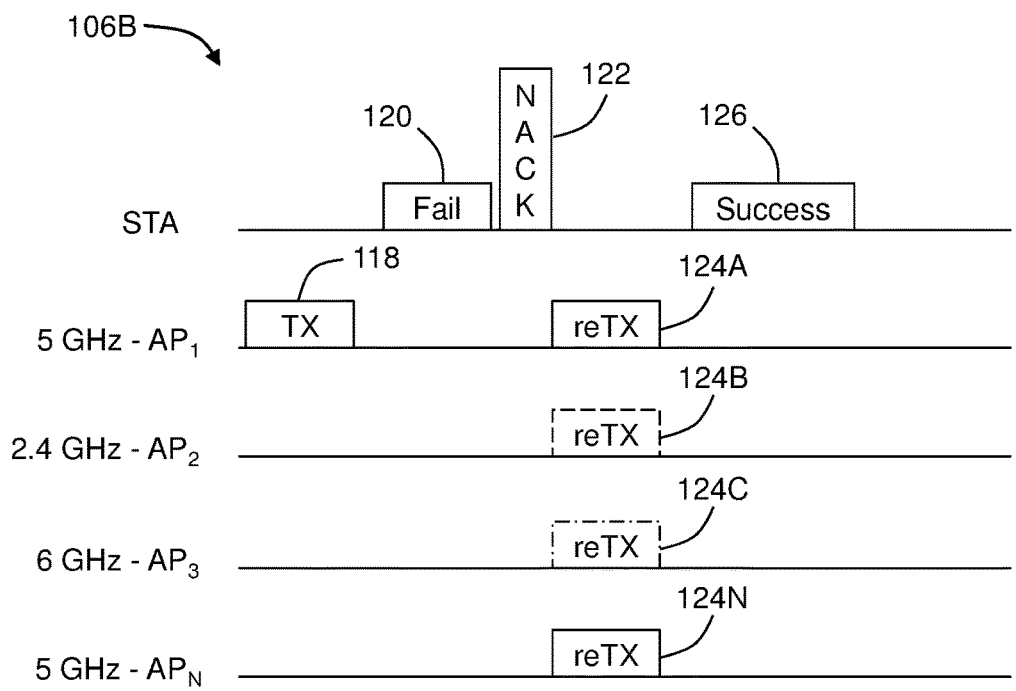
FIG. 1D illustrates an example communication flow for a hybrid distributed retry mechanism that may be implemented in the environment of FIG. 1C.

FIG. 1D illustrates an example communication flow 106B for a hybrid distributed retry mechanism that may be implemented in the environment 100B of FIG. 1C. As illustrated, the $AP_1$ 102A sends an original packet 118 to the STA 104 over the first radio link, which is a 5 GHz radio link in this example. The STA 104 receives the original packet 118 but is unable to decode it, illustrated as a failed packet 120 in FIG. 1D. The STA 104 may discard some or all of the failed packet 120 or store some or all of the failed packet 120 depending on a particular implementation of ARQ or HARQ implemented at the STA 104. Although not illustrated in FIG. 1D, in an example implementation, each or at least one of the other APs 102 may receive and successfully decode the original packet 118 despite not being an intended recipient of the original packet 118, provided the other APs are configured to communicate using the first radio link. In this and other implementations, one or more of the other APs 102 may overhear the original packet 118 on the first radio link when sent by the $AP_1$ 102A to the STA 104, may successfully decode the original packet 118 at the corresponding AP 102, and may save the original packet 118 locally at the corresponding AP 102 for subsequent retransmission in whole or in part to the STA 104, if needed.

In response to failing to decode the original packet 118, e.g., in response to the failed packet 120, the STA 104 may send a NACK or other STA response 122 to the $AP_1$ 102A to indicate that some or all of the original packet 118 failed to decode at the STA 104. The STA response 122 may be received by one or more of the APs 102, from which the corresponding AP(s) 102 may determine that the original packet 118 failed to decode at the STA 104. In other implementations, mechanisms other than the STA response 122—such as a timeout or trigger frame from the $AP_1$ 102A—may be used by the corresponding AP(s) 102 to determine that the original packet 118 failed to decode at the STA 104.

Typical ARQ/HARQ processes then send a retransmission packet 124A to the STA 104 from the $AP_1$ 102A that sent the original packet 118 and over the same first radio link as used to send the original packet 118. Where the channel between the $AP_1$ 102A and the STA 104 is substantially time and/or frequency invariant, such an approach to ARQ/HARQ may have limited retransmission gains.

According to implementations described herein, however, the $AP_1$ 102A may send the retransmission packet 124A over a different radio link than the original packet 118, such as over the second or third radio link. Alternatively or additionally, one or more of the other APs 102 that did not send the original packet 118 may send a corresponding retransmission packet 124B, 124C, 124N to the STA 104 over the same or different radio link than the original packet 118. For example, the $AP_2$ 102B may send the retransmission packet 124B over the second radio link, the $AP_3$ 102C may send the retransmission packet 124C over the third radio link, or the $AP_N$ 102N may send the retransmission packet 124N over the first radio link. More generally, any of the APs 102 that send a retransmission packet to the STA 104 may send the retransmission packet over any of the radio links supported by both the STA 104 and the corresponding AP 102.

In some implementations, prior to transmission of the original packet 118 and the retransmission packets 124, a handshake may occur between the STA 104 and the APs 102 where the STA 104 provides the APs 102 its supported radio links. Thus, when a retransmission packet 124 is to be sent to the STA 104 by a given one of the APs 102, the AP 102 may already know which radio links are supported by the STA 104.

Where the retransmission packet 124 is being sent to the STA 104 over a different radio link than the original packet 118, a control signal part of a preamble of the retransmission packet 124 may indicate that the retransmission packet 124 is a retransmission packet and/or that it belongs to a certain ARQ/HARQ identifier. This may permit the retransmission packet 124 sent over a different radio link than the original packet 118 to be used to decode the appropriate original packet 118. Any suitable ARQ/HARQ identifier may be implemented for this purpose.

As in FIGS. 1A-1B, each of the retransmission packets 124A, 124B, 124C, 124N (collectively "retransmission packets 124" or generically "retransmission packet 124") may include all or a portion of the original packet 118 or error correction information for the original packet. Providing at least one retransmission packet 124 to the STA 104 over a different radio link than the first radio link over which the original packet 118 was sent increases frequency diversity (and optionally channel diversity when sent from a different AP 102 than the original packet 118) and may therefore improve retransmission gain compared to sending the retransmission packet 124 only over the first radio link from the same $AP_1$ 102A that sent the original packet 118.

Similar to FIGS. 1A-1B, in some implementations where two or more of the APs 102 send retransmission packets 124 for the same failed packet 120, the APs 102 may synchronize with each other to simultaneously send their respective retransmission packets 124 to the STA 104. The APs 102 may use the original packet 118 or the STA response 122 to synchronize the retransmission.

Alternatively or additionally, one or more of the APs 102 in FIGS. 1C-1D may be engaged in an ongoing communication with an other STA (not shown) in the environment 100B. To avoid interference between the retransmission packet 124 and the ongoing communication, the APs 102 may coordinate directly with each other or through a central controller to permit simultaneous transmission of the ongoing communication and the retransmission packet, as already described above with respect to FIGS. 1A-1B.

The STA 104 receives the retransmission packet(s) 124 from one or more of the APs 102 and successfully decodes it(them), illustrated as a successfully decoded packet 126 in FIG. 1B. In more detail, for ARQ, the STA 104 may discard the failed packet 120 and successfully decode the original packet 118 using the retransmission packet(s) exclusive of the failed packet 120. For HARQ, the STA 104 may successfully decode the original packet 118 using either or both of the retransmission packet(s) 124 and the failed packet 120, e.g., using chase combining HARQ or IR-HARQ.

FIGS. 1C-1D describe the $AP_1$ 102A as sending the original packet 118 for convenience. More generally, any of the APs 102 may send the original packet 118 with one or more other APs 102 sending the retransmission packet 124.

Optionally, either or both of the environments 100A, 100B may further include a central controller 128 that is communicatively coupled with the APs 102. The central controller 128 may make retransmission assignments among the APs 102, trigger retransmissions, or perform other functions or operations as described herein.

Referring to all of FIGS. 1A-1D, the particular AP(s) 102 that send retransmission packets 114, 124 to the STA 104 may be determined in any suitable manner collectively by the APs 102 themselves, by the central controller 128, or by other entity. AP(s) 102 assigned to retransmission may be pre-configured in a specific pattern. Alternatively, the assignment may be opportunistic where whichever of the APs 102 has access to the medium in the next contention sends the retransmission packet 114, 124 or whichever AP 102 is closest to the STA 104 in that instant (e.g., when the retransmission packet 114, 124 is to be sent and potentially where the STA 104 is moving) may send the retransmission packet 114, 124. In these or other implementations, the $AP_1$ 102A that sent the original packet 108, 118 and/or the central controller 128 may determine which of the APs 102 is closest to the STA 104 or closer than at least one other AP 102 when the retransmission packet 114, 124 is to be sent or which has a better channel than at least one other AP 102 based on, e.g., mobility and channel coherence time as estimated at the STA 104 and/or the APs 102.

In an example, the central controller 128 may assign APs 102 within the network to send retransmission packets 114, 124 during predetermined time windows. For example, the central controller 128 may assign the $AP_1$ 102A and the $AP_2$ 102B to handle retransmissions in the environments 100A, 100B during a first predetermined time window and the $AP_3$ 102C and the $AP_N$ 102N to handle retransmissions in the environments 100A, 100B during a different second predetermined time window. In this example, and provided each of the $AP_1$ 102A and the $AP_2$ 102B has access to the original packet 108, 118 or payload thereof intended for the STA 104, if the STA 104 fails to decode the original packet 108, 118 (whether sent by the $AP_1$ 102A or other AP 102) during the first predetermined time window, the $AP_1$ 102A and the $AP_2$ 102B may send the retransmission packet 114A, 114B, 124A, 124B to the STA 104. In comparison, and provided each of the $AP_3$ 102C and the $AP_N$ 102BN has access to the original packet 108, 118 or payload thereof intended for the STA 104, if the STA 104 fails to decode the original packet 108, 118 (whether sent by the $AP_1$ 102A or other AP 102) during the second predetermined time window, the $AP_3$ 102C and the $AP_N$ 102N may send the retransmission packet 114C, 114N, 124C, 124N to the STA 104.

The retransmission assignments may be pre-scheduled across multiple successive predetermined time windows or may be determined on a rolling basis, e.g., at or towards an end of a current predetermined time window. Each predetermined time window may be about ten packets long or some other length. In an example, the central controller 128 may make retransmission assignments on a rolling basis based any suitable parameters or criteria, such as traffic through the APs 102. For example, the central controller 128 may determine that the $AP_3$ 102C has high traffic while $AP_2$ 102B has low traffic so the central controller 128 may assign the $AP_2$ 102B to retransmission for a next upcoming predetermined time period without assigning the $AP_3$ 102C to retransmission.

The predetermined time windows may all have the same duration or the duration may vary over time. For example, during summertime or on weekends or outside normal business hours, a significant number of employees may be out of office such that there is lighter traffic demand in the environments 100A, 100B. When there is generally less traffic demand, the central controller 128 may set the duration of the predetermined time window to be longer than other times of the year, month, or day. When traffic is more bursting in the environments 100A, 100B, the central controller 128 may set the duration of the predetermined time window to be shorter than when traffic is less bursting. Rather than or in addition to traffic demand, the central controller 128 may set the duration of the predetermined time window based on interference, CPU capabilities of the APs 102, or other parameters.

As mentioned elsewhere, the APs 102 that send a retransmission packet 114, 124 may send the retransmission packet 114, 124 responsive to receiving the STA response 122. Alternatively, the APs 102 that send retransmission packets 114, 124 may do so responsive to a timeout or a trigger frame from the AP 102 that sent the original packet 108, 118 or responsive to a trigger from the central controller 128.

In the timeout example, the STA 104 may be expected to send an acknowledgment packet (ACK) as a STA response to the $AP_1$ 102A when it successfully decodes the original packet 108, 118, rather than sending a NACK as the STA response 112, 122 when it fails to decode the original packet 108, 118. If the APs 102 receive the original packet 118 but then fail to receive the ACK from the STA 104 within a timeout period, the AP 102 may send the retransmission packet 114, 124 to the STA 104. Alternatively, if the $AP_1$ 102A that sent the original packet 108, 118 to the STA 104 fails to receive the ACK from the STA 104 within the timeout period, the $AP_1$ 102A may send a trigger frame to one or more of the other APs 102 requesting that the APs 102 send the retransmission packet 114, 124 to the STA 104. Alternatively, the central controller 128 may determine that the STA 104 failed to decode the original packet 108, 118 (e.g., based on feedback from the $AP_1$ 102A that sent the original packet 108, 118) and may trigger one or more of the APs 102 to send the retransmission packet 114, 124 to the STA 104. Accordingly, each assigned AP 102 may determine that the STA 104 has failed to decode the original packet 108, 114 based on the STA response 112, 122, a trigger frame, a timeout, or a trigger from the central controller 128.

As mentioned elsewhere, the APs 102 that send retransmission packets 114, 124 may overhear the original packet 108, 118 and use the overhead original packet 108, 118 for retransmissions. Alternatively or additionally, the APs 102 that send retransmission packets 114, 124 may obtain the original packet or all or a portion of a payload thereof from a side channel. Example side channels include different frequency channels than the original packet 108, 118, the central controller 128, the Internet, or other channels or data sources to which the APs 102 may be communicatively coupled. In the example of a side channel, the central controller 128 may trigger the AP 102 to send the retransmission packet 114, 124 and may also specify what should be included in the retransmission packet 114, 124. The AP 102 may then obtain the original packet 108, 118 or all or a portion of the payload thereof through the side channel and send the retransmission packet 114, 124 to the STA 104. For example, the APs 102 may have ethernet connections to the Internet that may be used as side channels. Alternatively, the STA 104 may poll the APs 102 for all or a portion of the payload of the original packet 108, 110 and the APs 102 may obtain all or the portion of the payload of the original packet through the side channel and send it to the STA 104 as the retransmission packet 114, 124.

Figure 2:
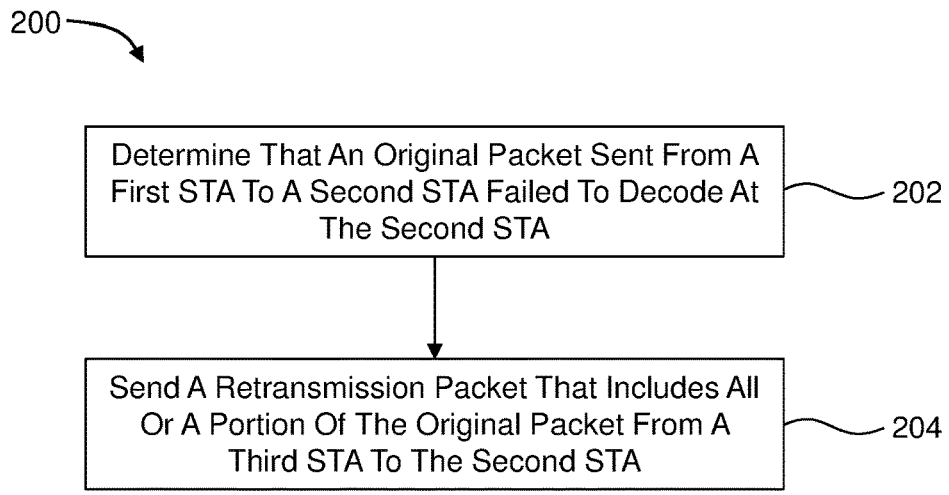
FIG. 2 illustrates a flowchart of an example method to perform hybrid distributed retries or retransmissions.

FIG. 2 illustrates a flowchart of an example method 200 to perform hybrid distributed retries or retransmissions. The method 200 may be performed by any suitable system, apparatus, or device. For example, one or more of the APs 102 of FIGS. 1A-1D may perform or direct performance of one or more of the operations associated with the method 200. More generally, a STA such as one or more of the APS 102 or the STA 104 of FIGS. 1A-1D may perform or direct performance of one or more of the operations associated with the method 200. The method 200 may include one or more blocks 202 or 204. The method 200 may begin at block 202.

At block 202, the method 200 may include determining that an original packet sent from a first STA to a second STA failed to decode at the second STA. The determination may be made at, e.g., a third STA. For example, referring to FIGS. 1A-1D, the $AP_2$ 102B as the third STA may determine that the original packet 108, 118 sent from the $AP_1$ 102A as the first STA to the STA 104 as the second STA failed to decode. Determining that the original packet failed to decode at the second STA may include receiving a STA response from the second STA that indicates that the original packet failed to decode at the second STA. Alternatively, determining that the original packet failed to decode at the second STA may include receiving a trigger frame from the first STA that indicates that the original packet failed to decode at the second STA. Alternatively, determining that the original packet failed to decode at the second STA may include overhearing the original packet sent from the first STA to the second STA and determining that a timeout interval has passed since overhearing the original packet without the second STA sending an ACK to the first STA to confirm successful decoding of the original packet. Alternatively, determining that the original packet failed to decode at the second STA may include receiving an indication from a central controller that the original packet failed to decode at the second STA and a request from the central controller to retransmit the original packet to the second STA. Block 202 may be followed by block 204.

At block 204, the method 200 may include sending a retransmission packet that includes all or a portion of the original packet or error correction information for the original packet from the third STA to the second STA. For example, referring to FIGS. 1A-1D, the $AP_2$ 102B as the third STA may send the retransmission packet 114B, 124B to the STA 104 as the second STA. The retransmission packet 114B, 124B may include all or a portion of the original packet 108, 118 or error correction information for the original packet 108, 118. The STA 104 may successfully decode the original packet based on the retransmission packet.

Although illustrated with discrete blocks, the steps and operations associated with one or more of the blocks of the method 200 may be divided into additional blocks, combined into fewer blocks, or eliminated, depending on the particular implementation. Alternatively or additionally, the method 200 may include additional blocks, steps, or operations.

For example, the method 200 may further include overhearing the original packet at the third STA when the original packet is sent by the first STA to the second STA. The method 200 may also include successfully decoding the original packet at the third STA. The method may also include saving the original packet locally at the third STA. The retransmission packet sent at block 204 may be generated from the successfully decoded packet at the third STA.

Alternatively or additionally, the method 200 may further include determining supported radio links of the second STA prior to sending the retransmission packet. In this and other implementations, sending the retransmission packet from the third STA to the second STA may include sending the retransmission packet to the second STA over a different radio link than a radio link over which the original packet was sent by the first STA to the second STA.

The method 200 may further include, prior to sending the retransmission packet, generating the retransmission packet with a more reliable MCS than the original packet. Alternatively or additionally, sending the retransmission packet to the second STA may include sending the portion of the original packet that is less than all of the original packet as the retransmission packet to the second STA.

In some implementations, the method 200 may further include synchronizing the third STA with one or more other STAs that are to send a corresponding retransmission packet to the second STA. In these and other implementations, sending the retransmission packet from the third STA to the second STA may include sending the retransmission packet from the third STA to the second STA simultaneous with the one or more other STAs sending the corresponding retransmission packet to the second STA.

The method 200 may further include coordinating the third STA with a fourth STA that is sending an ongoing communication to a fifth STA. In this and other implementations, sending the retransmission packet from the third STA to the second STA may include sending the retransmission packet from the third STA to the second STA orthogonally with respect to the ongoing communication between the fourth STA and the fifth STA.

In some implementations, the first STA that sent the original packet or a central controller may determine that the third STA is closer to the second STA than one or more other STAs or has a better channel to the second STA than one or more other STAs, which determination may be communicated to the third STA. In these and other implementations, sending the retransmission packet may occur in response to both determining that the original packet failed to decode at the second STA and the third STA being closer to the second STA than the one or more other STAs or the third STA having a better channel to the second STA than the one or more other STAs.

The method 200 may further include receiving a message from a central controller configured to schedule packet retransmissions among multiple APs. The message may instruct the third STA to provide retransmissions for every failed original packet it determines for the STA during at least a predetermined time window. In this and other implementations, sending the retransmission packet may occur in response to both receiving the message and determining that the original packet failed to decode at the STA during the predetermined time window.

Alternatively or additionally, the method 200 may further include receiving a poll from the STA that requests data in the original packet.

In some implementations, the third STA may be configured to obtain the original packet for retransmission by overhearing transmission of the original packet from the first STA to the second STA or by directly obtaining data of the original packet through a side channel.

Figure 3:
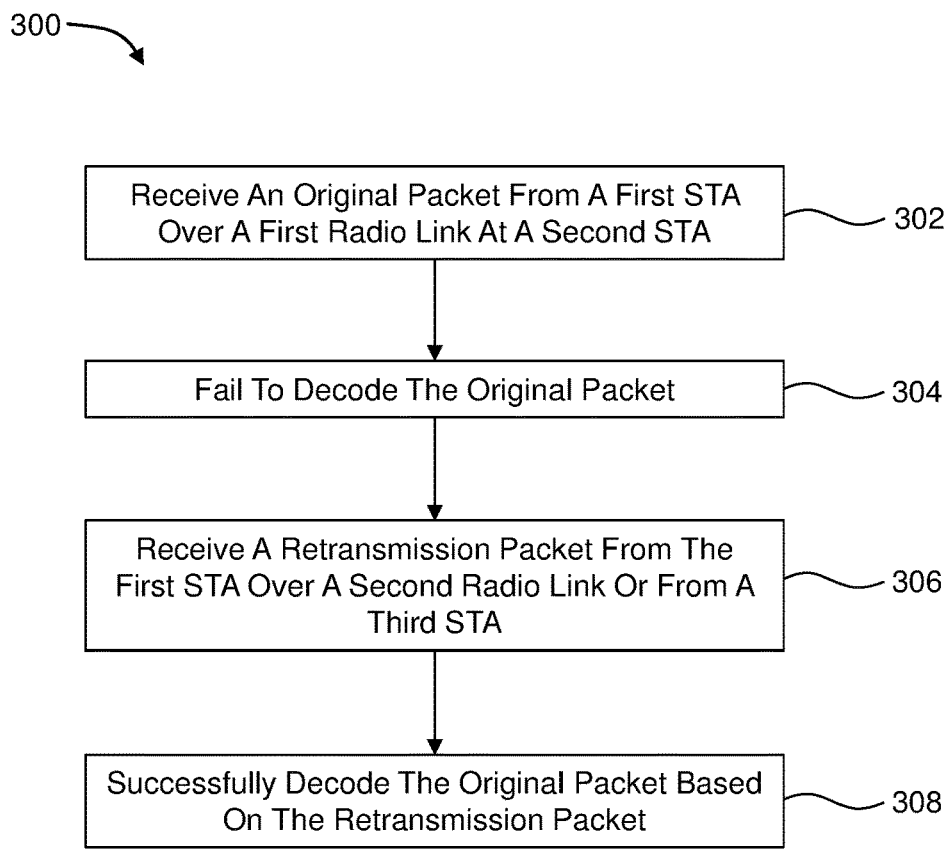
FIG. 3 illustrates a flowchart of an example method to implement ARQ/HARQ from hybrid distributed retries or retransmissions.

FIG. 3 illustrates a flowchart of an example method 300 to implement ARQ/HARQ from hybrid distributed retries or retransmissions. The method 300 may be performed by any suitable system, apparatus, or device. For example, the STA 104 of FIGS. 1A-1D may perform or direct performance of one or more of the operations associated with the method 300. The method 300 may include one or more blocks 302, 304, 306, or 308. The method 300 may begin at block 302.

At block 302, the method 300 may include receiving an original packet from a first STA over a first radio link at a second STA. For example, referring to FIGS. 1A-1D, the STA 104 as the second STA may receive the original packet 108, 118 from the $AP_1$ 102A as the first STA over the first radio link. The first radio link may include the 5 GHz radio link or some other radio link. Block 302 may be followed by block 304.

At block 304, the method 300 may include failing to decode the original packet to produce a failed packet. For example, referring to FIGS. 1A-1D, the STA 104 may fail to decode the original packet 108, 118 to produce the failed packet 110, 120. Block 304 may be followed by block 306.

At block 306, the method 300 may include receiving a retransmission packet that includes all or a portion of the original packet or error correction information for the original packet from the first STA over a second radio link that is different than the first radio link or from a third STA that is different than the first STA. For example, referring to FIGS. 1A-1D, the STA 104 as the second STA may receive the retransmission packet 124A from the $AP_1$ 102A as the first STA over the second radio link that is different than the first radio link. The second radio link may include the 2.4 GHz radio link or some other radio link that is different than the first radio link. Alternatively or additionally, the STA 104 as the second STA may receive the retransmission packet 114B, 124B from the $AP_2$ 102B as the third STA. The retransmission packet 114B, 124B may be received by the STA 104 over any radio link, including the first radio link, the second radio link, or some other radio link. Block 306 may be followed by block 308.

At block 308, the method 300 may further include successfully decoding the original packet based on the retransmission packet. For example, referring to FIGS. 1A-1D, the STA 104 as the second STA may successfully decode the original packet 108, 118 based on the retransmission packet 114, 124, e.g., according to any suitable ARQ or HARQ protocol.

In some implementations, the retransmission packet has a more reliable MCS than the original packet. In these and other implementations, successfully decoding the original packet based on the retransmission packet may include successfully decoding the original packet using the retransmission packet exclusive of the failed packet according to an ARQ protocol.

Alternatively or additionally, successfully decoding the original packet based on the retransmission packet may include successfully decoding the original packet using both the retransmission packet and the failed packet according to a HARQ protocol.

In an example, the retransmission packet may include a first retransmission packet. Receiving the first retransmission packet may include receiving the first retransmission packet from the third STA. The method 300 may further include receiving a second retransmission packet that includes all or a portion of the original packet or error correction information for the original packet from the first STA or a fourth STA.

As another example where the retransmission packet includes a first retransmission packet, receiving the first retransmission packet may include receiving the first retransmission packet from the first STA over the second radio link. The method 300 may further include receiving a second retransmission packet from the third STA over the first radio link or a third radio link. In this and other examples, the original packet and the first and second retransmission packets may be received at the second STA and the method may further include, prior to receiving the first and second retransmission packets at the second STA, providing supported radio links of the second STA to the first and third STAs, e.g., via a handshake.

In some implementations, the method 300 may further include generating and transmitting a STA response responsive to failing to decode the original packet. The STA response may trigger the first STA or the third STA to send the retransmission packet.

Alternatively or additionally, the method 300 may further include failing to send an ACK frame to the first STA responsive to failing to decode the original packet. In this and other implementations, passage of a timeout following transmission of the original packet from the first STA to the third STA without receiving the ACK at the third STA may trigger the third STA to send the retransmission packet. Alternatively, passage of the timeout following transmission of the original packet from the first STA to the third STA without receiving the ACK at the first STA may trigger the first STA to request the third STA to send the retransmission packet to the second STA.

The method 300 may further include polling one or more other STAs that includes the third STA and excludes the first STA for data included in the original packet in response to failing to decode the original packet. The third STA may send the retransmission packet to the second STA responsive to both being polled and having access to the data.

Figure 4:
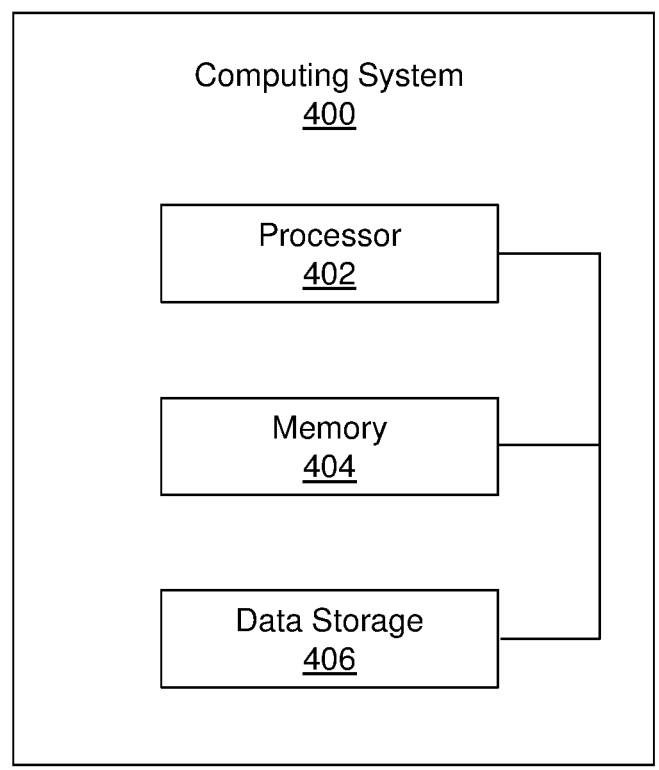
FIG. 4 illustrates a block diagram of an example computing system that may be used to implement a hybrid distributed retry mechanism

FIG. 4 illustrates a block diagram of an example computing system 400 that may be used to implement a hybrid distributed retry mechanism. The computing system 400 may be configured to implement or direct one or more operations associated with any of the ARQ/HARQ protocols or other algorithms or protocols described herein. The computing system 400 may include, correspond to, or be included in any of the APs 102, the STA, or the central controller 128 or other APs, STAs, or central controllers described herein. The computing system 400 may include a processor 402, a memory 404, and a data storage 406. The processor 402, the memory 404, and the data storage 406 may be communicatively coupled.

In general, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 402 may include any number of processors configured to, individually or collectively, perform or direct performance of any number of operations described in the present disclosure. Additionally, one or more of the processors may be present on one or more different electronic devices, such as different servers.

In some implementations, the processor 402 may be configured to interpret and/or execute program instructions and/or process data stored in the memory 404, the data storage 406, or the memory 404 and the data storage 406. In some implementations, the processor 402 may fetch program instructions from the data storage 406 and load the program instructions in the memory 404. After the program instructions are loaded into memory 404, the processor 402 may execute the program instructions.

For example, in some implementations, a hybrid distributed retry or ARQ/HARQ module may be included in the data storage 406 as program instructions. The processor 402 may fetch the program instructions of the hybrid distributed retry or ARQ/HARQ module from the data storage 406 and may load the program instructions of the hybrid distributed retry or ARQ/HARQ module in the memory 404. After the program instructions of the hybrid distributed retry or ARQ/HARQ module are loaded into memory 404, the processor 402 may execute the program instructions such that the computing system may implement the operations associated with the corresponding module as directed by the instructions.

The memory 404 and the data storage 406 may include computer-readable storage media for carrying or having computer-executable instructions or data structures stored thereon. Such computer-readable storage media may include any available media that may be accessed by a general-purpose or special-purpose computer, such as the processor 402. By way of example, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the operations or blocks of FIG. 2 and/or FIG. 3.

Modifications, additions, or omissions may be made to the computing system 400 without departing from the scope of the present disclosure. For example, in some implementations, the computing system 400 may include any number of other components that may not be explicitly illustrated or described. Alternatively or additionally, the computing system 400 may be included in another system, such as an AP, a STA, a central controller, or other device or system. In such implementations, the system may include one or more other components, such as one or more radios, antennas, transmit chains, receive chains, or other components.

Some portions of the detailed description are presented in terms of algorithms and symbolic representations of operations within a computer, such as the computing system 400. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple input multiple output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example or examples (e.g., example 2), or combined with aspects of another example. The following is a non-limiting summary of some example implementations presented herein.

Example 1. A method, comprising:
determining that an original packet sent from a first wireless station (STA) to a second STA failed to decode at the second STA; and
sending a retransmission packet that includes all or a portion of the original packet or error correction information for the original packet from a third STA to the second STA.

Example 2. A method, comprising:
receiving an original packet from a first wireless station (STA) over a first radio link at a second STA;
failing to decode the original packet to produce a failed packet;
receiving a retransmission packet that includes all or a portion of the original packet or error correction information for the original packet from:
the first STA over a second radio link that is different than the first radio link; or
a third STA that is different than the first STA; and
successfully decoding the original packet based on the retransmission packet.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

determining at a first access point (AP) that a first original packet sent from a second AP to a wireless station (STA) failed to decode at the STA, including overhearing the first original packet sent from the second AP to the STA and determining that a timeout interval has passed since overhearing the first original packet without the STA sending an ACK to the second AP to confirm successful decoding of the first original packet;

sending from the first AP a first retransmission packet that includes error correction information for the first original packet to the STA;

the first AP coordinating with a third AP that is sending an ongoing communication to another STA to avoid interference between the first retransmission packet and the ongoing communication, including the first AP implementing in coordination with the third AP time division multiple access (TDMA) transmission in which the first AP sends the first retransmission packet to the STA in a first TDMA time slot assigned to the first AP and the third AP sends the ongoing communication to the other STA in a second TDMA time slot assigned to the third AP; and sending a second original packet from the first AP to the STA or the other STA, wherein one or both of the second AP or the third AP sends a second retransmission packet corresponding to the second original packet to the STA or the other STA in response to the second AP or the third AP determining that the second original packet failed to decode at the STA or the other STA;

wherein the first AP implements one or more Institute of Electrical and Electronics Engineers (IEEE) 802.11 protocols and the first, second, and third APs are at a same level in an architecture of the one or more IEEE 802.11 protocols; and wherein the method further comprises determining supported radio links of the STA prior to sending the retransmission packet, wherein sending the retransmission packet from the first AP to the STA comprises sending the retransmission packet to the STA over a different radio link than a radio link over which the first original packet was sent by the second AP to the STA.

2. The method of claim 1, further comprising, prior to sending the retransmission packet:

successfully decoding the first original packet at the first AP; and saving the first original packet locally at the first AP.

3. The method of claim 1, further comprising generating the retransmission packet with a more reliable modulation and coding scheme (MCS) than the first original packet.

4. The method of claim 1, wherein sending the retransmission packet to the STA comprises sending the portion of the first original packet that is less than all of the first original packet as the retransmission packet to the STA.

5. The method of claim 1, further comprising synchronizing the first AP with one or more other STAs that are to send a corresponding retransmission packet to the STA, wherein sending the retransmission packet from the first AP to the STA comprises sending the retransmission packet from the first AP to the STA simultaneous with the one or more other STAs sending the corresponding retransmission packet to the STA.

6. The method of claim 1, wherein determining that the first original packet failed to decode at the STA comprises receiving an indication from a central controller that the first original packet failed to decode at the-STA and a request from the central controller to retransmit the first original packet to the-STA.

7. The method of claim 1, wherein:

the first AP is closer to the STA than one or more other STAs or has a better channel to the STA than the one or more other STAs; and sending the retransmission packet occurs in response to both determining that the first original packet failed to decode at the STA and the first AP being closer to the STA than the one or more other STAs or the first AP having a better channel to the STA than the one or more other STAs.

8. The method of claim 1, further comprising receiving a message from a central controller configured to schedule packet retransmissions among multiple STAs, the message instructing the first AP to provide retransmissions for every failed original packet the first AP determines for the STA during at least a predetermined time window, wherein sending the retransmission packet occurs in response to both receiving the message and determining that the first original packet failed to decode at the STA during the predetermined time window.

9. The method of claim 1, wherein determining that the first original packet failed to decode at the STA comprises receiving a trigger frame from the second AP that indicates that the first original packet failed to decode at the STA without first receiving a response from the STA that indicates the first original packet failed to decode at the STA.

10. The method of claim 1, further comprising receiving a poll from the STA that requests data in the first original packet.

11. The method of claim 1, wherein the second AP comprises a first access point and the first AP comprises a second access point.

12. An access point (AP) that implements one or more Institute of Electrical and Electronics Engineers (IEEE) 802.11 protocols, the AP comprising:

a processor device; and a non-transitory computer-readable storage medium communicatively coupled to the processor device and having computer-readable instructions stored thereon, wherein in response to execution of the computer-readable instructions by the processor device, the processor device is configured to perform or control performance of operations comprising:

determining at the AP that a first original packet sent from a second AP to a wireless station (STA) failed to decode at the STA, including overhearing the first original packet sent from the second AP to the STA and determining that a timeout interval has passed since overhearing the first original packet without the STA sending an ACK to the second AP to confirm successful decoding of the first original packet; and sending from the AP a first retransmission packet that includes error correction information for the first original packet to the STA, the AP coordinating with a third AP that is sending an ongoing communication to another STA to avoid interference between the first retransmission packet and the ongoing communication, including the AP implementing in coordination with the third AP time division multiple access (TDMA) transmission in which the AP sends the first retransmission packet to the STA in a first TDMA time slot assigned to the AP and the third AP sends the ongoing communication to the other STA in a second TDMA time slot assigned to the third AP; and sending a second original packet from the AP to the STA or the other STA, wherein one or both of the second AP or the third AP sends a second retransmission packet corresponding to the second original packet to the STA or the other STA in response to the second AP or the third AP determining that the second original packet failed to decode at the STA or the other STA;

wherein the AP, the second AP, and the third AP are at a same level in an architecture of the one or more IEEE 802.11 protocols; and wherein the operations further comprise determining supported radio links of the STA prior to sending the retransmission packet, wherein sending the retransmission packet from the AP to the STA comprises sending the retransmission packet to the STA over a different radio link than a radio link over which the first original packet was sent by the second AP to the STA.

13. The AP of claim 12, the operations further comprising, prior to sending the retransmission packet:
   successfully decoding the original packet at the AP; and
   saving the original packet locally at the AP.

14. The AP of claim 12, the operations further comprising synchronizing the AP with one or more other STAs that are to send a corresponding retransmission packet to the STA, wherein sending the retransmission packet from the AP to the STA comprises sending the retransmission packet from the AP to the STA simultaneous with the one or more other STAs sending the corresponding retransmission packet to the STA.

15. The AP of claim 12, the operations further comprising coordinating the AP with a fourth STA that is sending an ongoing communication to a fifth STA, wherein sending the retransmission packet from the AP to the STA comprises sending the retransmission packet from the AP to the STA orthogonally with respect to the ongoing communication between the fourth STA and the fifth STA.

16. The AP of claim 12, wherein:
   the AP is closer to the STA than one or more other STAs or has a better channel to the STA than the one or more other STAs; and
   sending the retransmission packet occurs in response to both determining that the original packet failed to decode at the STA and the AP being closer to the STA than the one or more other STAs or the AP having a better channel to the STA than the one or more other STAs.

17. The AP of claim 12, the operations further comprising receiving a message from a central controller configured to schedule packet retransmissions among multiple STAs, the message instructing the AP to provide retransmissions for every failed original packet the AP determines for the STA during at least a predetermined time window, wherein sending the retransmission packet occurs in response to both receiving the message and determining that the original packet failed to decode at the STA during the predetermined time window.

18. A non-transitory computer-readable storage medium having computer-readable instructions stored thereon, wherein in response to execution of the computer-readable instructions by a processor device, the processor device is configured to perform or control performance of operations comprising:
   determining at a first access point (AP) that a first original packet sent from a second AP to a wireless station (STA) failed to decode at the STA, wherein the processor device is part of the first AP and determining that the first original packet failed to decode at the STA comprises overhearing the first original packet sent from the second AP to the STA and determining that a timeout interval has passed since overhearing the first original packet without the STA sending an ACK to the second AP to confirm successful decoding of the first original packet;
   sending from the first AP a first retransmission packet that includes error correction information for the first original packet to the STA;
   the first AP coordinating with a third AP that is sending an ongoing communication to another STA to avoid interference between the first retransmission packet and the ongoing communication, including the first AP implementing in coordination with the third AP time division multiple access (TDMA) transmission in which the first AP sends the first retransmission packet to the STA in a first TDMA time slot assigned to the first AP and the third AP sends the ongoing communication to the other STA in a second TDMA time slot assigned to the third AP; and
   sending a second original packet from the first AP to the STA or the other STA, wherein one or both of the second AP or the third AP sends a second retransmission packet corresponding to the second original packet to the STA or the other STA in response to the second AP or the third AP determining that the second original packet failed to decode at the STA or the other STA;
   wherein the first AP implements one or more Institute of Electrical and Electronics Engineers (IEEE) 802.11 protocols and the first, second, and third APs are at a same level in an architecture of the one or more IEEE 802.11 protocols; and
   wherein the operations further comprise determining supported radio links of the STA prior to sending the retransmission packet, wherein sending the retransmission packet from the AP to the STA comprises sending the retransmission packet to the STA over a different radio link than a radio link over which the first original packet was sent by the second AP to the STA.

* * * * *